A. JAKOVLEFF.
VEHICLE TIRE.
APPLICATION FILED JULY 23, 1918. RENEWED AUG. 18, 1919.

1,335,713.

Patented Mar. 30, 1920.

Inventor
Alexis Jakovleff
By Strong & Townsend
Attorneys

UNITED STATES PATENT OFFICE.

ALEXIS JAKOVLEFF, OF SAN FRANCISCO, CALIFORNIA, ASSIGNOR TO JAK TIRE CORPORATION, OF SAN FRANCISCO, CALIFORNIA, A CORPORATION OF CALIFORNIA.

VEHICLE-TIRE.

1,335,713.  Specification of Letters Patent.  Patented Mar. 30, 1920.

Application filed July 23, 1918, Serial No. 246,299. Renewed August 18, 1919. Serial No. 318,313.

*To all whom it may concern:*

Be it known that I, ALEXIS JAKOVLEFF, a citizen of Russia, residing at the city and county of San Francisco and State of California, have invented new and useful Improvements in Vehicle-Tires, of which the following is a specification.

This invention relates to a vehicle wheel, and particularly pertains to a pneumatic tire therefor.

The object of the invention is to provide a demountable tire construction which is simple, practical, easy of construction, puncture-proof and easy riding, with interchangeable parts.

To this end I provide a casing in separable sections, in conjunction with suitable inner and outer rims united to form a complete casing and tread, all as will be more fully set forth and described hereinafter.

Having reference to the accompanying drawings.

Figure 1:
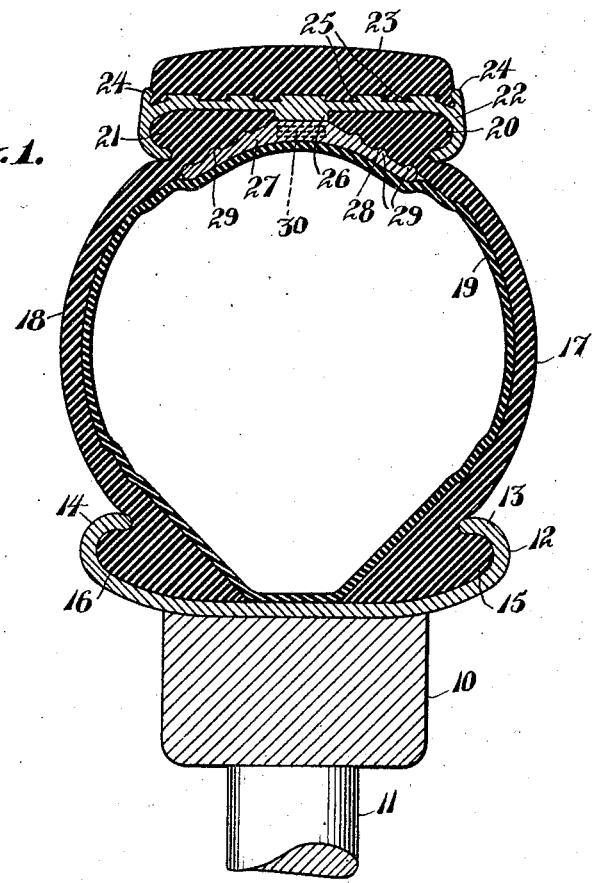
Figure 1 is a view in transverse section disclosing the vital elements of the present invention and their correlation to each other and the vehicle wheel.
Figure 2:
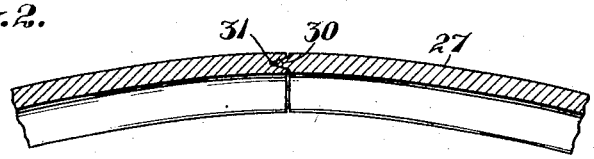
Fig. 2 is a fragmentary view in section and elevation, illustrating the interlocking ends of the expansion ring used in the present device.
Figure 3:
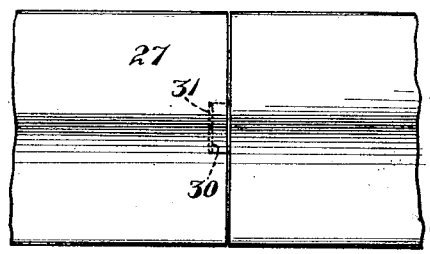
Fig. 3 is a fragmentary view in elevation, illustrating the ends of the ring as locked.

Referring more particularly to the drawings, 10 indicates the felly of a wheel supported upon suitable spokes 11. Mounted around the circumference of the felly is a clencher tire rim 12 of ordinary construction, that is, the rim is provided with a central annular body portion, the opposite marginal edges of which are turned to form clencher flanges 13 and 14. These flanges are adapted to receive clencher beads 15 and 16 of opposite casing parts 17 and 18. These parts are of substantially the same sectional contour as the ordinary pneumatic tire casing. However, in the present instance they are separated to form complementary halves disposed along the opposite sides of a pneumatic tire tube 19 and extending entirely around the rim. The outer terminating edges of these halves 17 and 18 are formed with clencher beads 20 and 21, respectively. These beads are engaged by an outer clencher rim 22 which is formed with inturned clencher flanges similar to the flanges 13 and 14 and which flanges bind the outer edges of the casing parts together.

The outer clencher rim 22 is provided for detachably securing the casing parts together and also has a circumferential mounting for an auxiliary cushion tread 23. This tread may be formed of any resilient material, preferably rubber and fabric composition, and is molded upon the rim. The opposite sides of this rim are formed with outwardly projecting flanges 24 between which the tire cushion rests. In order to further secure the tread upon the rim and to prevent it from creeping a series of continuous V-shaped grooves 25 extend entirely around the outer face of the rim in parallel relation to each other. It will thus be seen that when the composition becomes embedded within these grooves it will interlock to form a rigid combination therewith.

The inner circumference of the outer rim 22 is formed with a central circumferential flange 26 which is so formed as to exactly register with the space between the adjacent ends of the clencher beads of the casing. This flange is adapted to be borne against by an expansion ring 27 by which the clencher beads are positively held in interlocked relation to their flanges. The ring 27 extends continuously around the inner circumference of the clencher rim 22 and is preferably formed of spring steel which is also the case with the outer clencher rim, thus insuring that the ring and rim will have a slight degree of resiliency depending upon the thickness of the spring steel to absorb the local minor road shocks and thereafter impart the major shocks to the pneumatic casing and tube.

The ring 27 is of angular formation when considered in transverse section, that is, the outer face of the ring is adapted to conform to the converging surfaces of the tire beads and to further register with circumferentially extending grooves 28 in these surfaces. The grooves 28 are spaced in relation to each other and receive protruding beads 29 which continue around the outer surface of the ring and interlock with the recesses to prevent the outer casing parts from pulling away from their clencher flanges and inturning against the tube. Due to the wedge-shaped sectional formation of the ring and its resilient nature the outer marginal edges of the casing members will be positively held in relation to the outer clencher rim. It is desirable to form the locking ring in a manner to insure its ready removal from position when desired and the ring has therefore been transversely split in its circumference. The abutting ends of the ring at this split have been formed one with a locking tongue 30 and the other with a complementary recess 31 into which the tongue projects. Due to this construction the ring will operate as a complete annulus and its ends may be readily separated and contracted to effect its removal.

In using the present invention it will be readily understood that the two halves of the clencher casing may be positioned around the inner ring 12, as in common tire construction. A pneumatic tube may then be placed in proper relation to these halves after which the expansion ring 27 and the outer clencher rim 22 may be applied. It will be further observed that after the tire is assembled, as shown in the drawings, either of the casing sections may be removed without materially affecting the opposite section. When a tire of the present construction is used on the road the tread 23 will receive the wear and withstand the minor vibrations of the load, after which the shock will be transmitted to the casing and the pneumatic tube, as is common, through the resilient lock ring 27 and clencher rim 22.

It will thus be seen that the structure here disclosed affords a simple form of tire which may be readily manipulated to allow access to the pneumatic tube therein as well as to provide ease of application to a vehicle wheel.

While I have shown the preferred form of my invention as now known to me, I wish it understood that various changes in the combination, construction and arrangement of parts may be made by those skilled in the art without departing from the spirit of my invention as claimed.

Having thus described my invention, what I claim and desire to secure by Letters Patent is—

1. In a vehicle tire, a casing formed in halves, an outer rim having side flanges to grip the peripheral parts of the casing halves, a central inwardly projecting flange on the inner face of said rim and having its opposite sides formed to abut the free edges of the casing halves, and an expansion ring of approximately angular cross-section having the center of its outer face seated on said central flange of the outer rim, said ring having peripheral beads on each side thereof received in grooves provided therefor in the inner faces of the casing halves and the free side edges of the ring lying opposite to and confronting the free side edges of the flanges of the outer rim so as to form contracted neck portions therewith.

2. In a vehicle tire, a casing formed in halves, an outer rim having side flanges to grip the peripheral parts of the casing halves, a central inwardly projecting flange on the inner face of said rim and having its opposite sides formed to abut the free edges of the casing halves, and an expansion ring of approximated angular cross-section having the center of its outer face seated on said central flange of the outer rim, the free side edges of the ring lying opposite to and confronting the free side edges of the side flanges of the outer rim so as to form contracted neck portions therewith.

3. In a vehicle tire, a casing formed in halves, an outer rim having side flanges to grip the peripheral parts of the casing halves, a central inwardly projecting flange on the inner face of said rim and having its opposite sides formed to abut the free edges of the casing halves, and an expansion ring of approximately angular cross-section having the center of its outer face seated on said central flange of the outer rim, said ring having annular circumferential projections at the free sides thereof which projections extend toward and lie opposite to the free side edges of the flanges of the outer ring so as to form contracted neck portions therewith.

4. In a vehicle tire, a casing formed in halves, an outer rim having side flanges, the free edges of which extend into the outer faces of the peripheral parts of the casing halves, and an expansion ring of angular cross section engaged with the inner faces of the peripheral parts of the casing halves, said ring having flanged edges extending outwardly toward the periphery of the casing and approximately radially thereof into the inner faces of the peripheral parts of the casing halves opposite to the free edges of the side flanges of the outer rim whereby to form contracted portions in the casing halves.

5. In a vehicle tire, a casing formed in halves, an outer rim having side flanges to grip the peripheral parts of the casing halves, and an expansion ring engaged with the inner faces of the peripheral parts of the casing halves, said ring being split and having a locking tongue on one end and having a recess in its opposite end receiving the tongue whereby to completely house the latter.

In testimony whereof I have hereunto set my hand in the presence of two subscribing witnesses.

ALEXIS JAKOVLEFF.

Witnesses:
ALVA MILLER,
CONSTANCE M. GAMMETER.